April 18, 1939.  B. H. LANTZ  2,155,137

HAY FORK HEAD

Filed Jan. 8, 1937  2 Sheets-Sheet 1

Brice H. Lantz, INVENTOR.

BY  N. S. Amstutz

ATTORNEY.

April 18, 1939.  B. H. LANTZ  2,155,137
HAY FORK HEAD
Filed Jan. 8, 1937  2 Sheets-Sheet 2
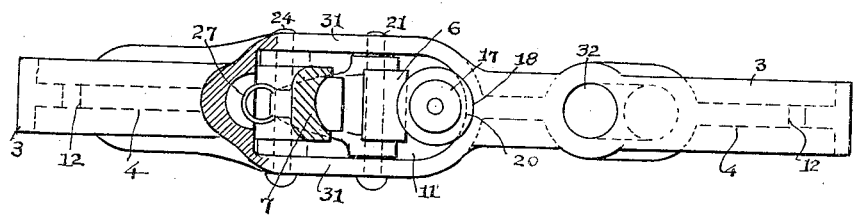
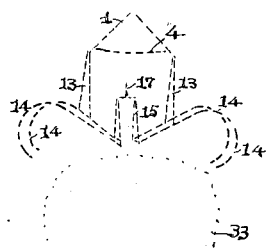
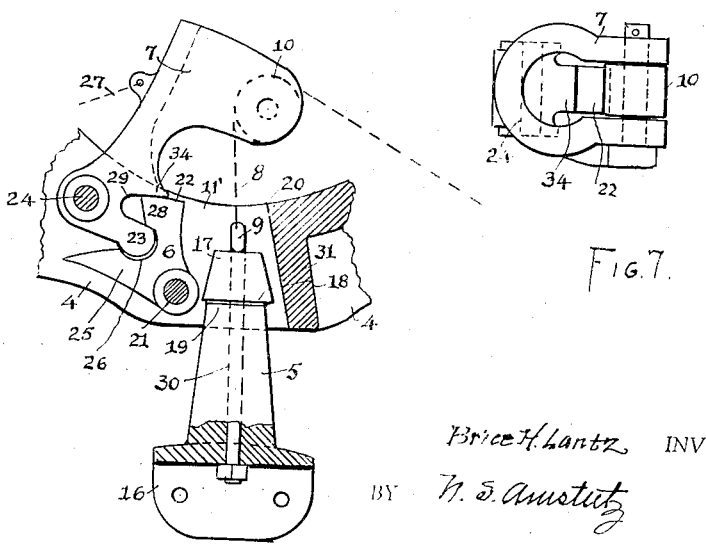
Brice H. Lantz INVENTOR.
BY  N. S. Amstutz
ATTORNEY.

Patented Apr. 18, 1939

2,155,137

UNITED STATES PATENT OFFICE 2,155,137

HAY FORK HEAD

Brice H. Lantz, Valparaiso, Ind., assignor to Lida S. Lantz and Brice H. Lantz, doing business as Lantz Manufacturing Company, Valparaiso, Ind.

Application January 8, 1937, Serial No. 119,664

6 Claims. (Cl. 294—109)

My invention relates to improvements in hay fork heads and it more especially consists of the features pointed out in the annexed claims.

The purpose of my invention is to provide an interlocking hay fork head that locks a trip lever with a separate interlocking member to positively hold the trip lever in either extreme position of its movement so as to insure that none of the moving parts will remain at any mid-positions; that also insures that the parts will be unlocked to dump the load of hay and on a pull of the same releasing chain or rope will also automatically relatch the parts as the tines and their swivel are drawn to the head ready for another load. This hay fork head is an improvement on patents issued to Amos B. Lantz, viz, No. 1,434,710, November 7, 1922 and No. 1,489,256, April 8, 1924.

With these and other ends in view I illustrate in the accompanying drawings such instances of adaptation as will show the broad underlying features of the invention without limiting myself to the specific details shown thereon and described herein.

Fig. 3 is a top plan view on line 3—3 of Fig. 2.

Fig. 4 is a diagrammatic view showing a load on the tines.

Fig. 5 is a diagrammatic view similar to Fig. 4 showing the load released.

Fig. 6 is a fragmentary view of the central portion of Fig. 2, partly in section, showing the swivel released and the trip lever in its limit of release movement.

Fig. 7 is a plan view showing the trip lever in the position illustrated by Fig. 6.

Figure 1:
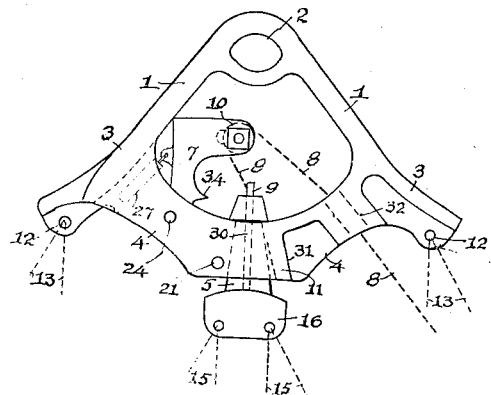
Fig. 1 is a side elevation of the fork head with the parts in latched position.
Figure 2:
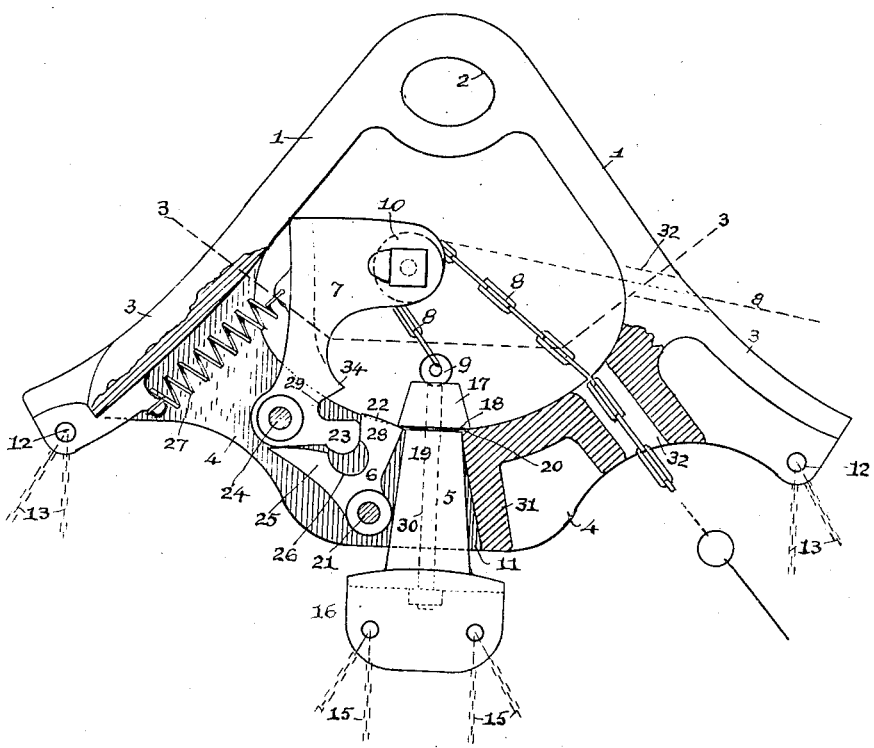
Fig. 2 is an enlarged side elevation similar to Fig. 1 partly in section.

In practicing my invention I may use whatever alternatives or expedients of construction that the exigencies of varying conditions may demand without departing from the broad spirit of the invention.

The head 1 is made up of a single casting. It has a supporting eye 2, two diagonal arms 3 that are joined by a cross bar 4, all of the parts of the casting roughly simulating the capital letter A. At the center of the cross bar an opening is formed to receive the swivel 5 and the interlock 6 and the trip lever 7. A chain 8 is connected to the swivel at 9. It passes over a roller 10 at the upper end of the trip lever and downward through an opening 32 to some distance where it may be attached to a trip rope, not shown.

At the ends of the diagonal arms 3 openings 12 are formed for the attachment of two chains 13 which are secured, one to each tine 14 about midway of its length. At the end of the other arm 3 a duplicate pair of chains 13 are similarly attached to a duplicate set of tines. The "eye" ends of a pair of tines 14 are attached to a pair of chains 15 which in turn are secured to a bottom enlargement 16 of the swivel and a duplicate pair of chains secures the "eye" ends of the other pair of tines to the enlargement 16. All of these connections leave the tines entirely independent of each other thus securing the universality of operation which characterizes this type of fork.

The swivel 5 has an enlarged semiconical upper end 17 with a shoulder 18 and a reduced diameter body portion 19 between the head 17 and the enlargement 16. The shoulder rests on the edge 20 of the opening 11 while supporting the load 33 that is suspended on the tines 14. It is prevented from becoming separated from the edge 20 by the interlocking dog 6 which is pivoted at 21. Its upper edge 22, when locked is under the shoulder 18 where it is held against displacement by the toe 23 of the trip lever 7 because the toe, the shoulder 18 the upper end of the dog 6 and the pivot 24 of the trip lever are about on the same horizontal plane.

The dog 6 has an L extension 25 which engages the underside of the trip lever 7 and it has a circular recess 26 into which the toe 23 can pass when the trip lever 7 is pulled by the trip chain 8 against the action of the retracting spring 27. As the lever 7 is pulled to the right on its pivot 24 the extension 25 is held down and the upper end 28 of the dog 6 is moved to the left where it enters a recess 29 beneath a projection 34 formed on the trip lever 7. From this it will be seen that these parts are absolutely interlocked in either extreme of movement.

The trip chain 8 is secured to an eye bolt 30 which passes, lengthwise through the swivel. A nut holds it at the bottom end within a channel formed in the enlargement 16.

On the pull of the trip rope the dog 6 is pulled from beneath the shoulder 18 of the swivel. The swivel drops through the opening 11 in the casting formed between the wall 31 and the dog 6, due to the load on the tines 14. This drops the "eye" ends of the tines 14 while they are held up by the chains 13, this instantly releases the load because the pointed ends of the tines 14 will be almost vertical. On again pulling the trip rope the swivel is raised to its formed position and a momentary release on the trip lever 7 allows the spring 27 to act and move the dog 6 under the shoulder 18 to hold the swivel in place. The trip chain 8 passes through an opening 32 in the cross bar 4.

What I claim is:

1. In hay fork heads, a single casting constituting a head having an eyelet by which it is supported, a detachable swivel supported by the head said swivel having suspended therefrom a pair of supporting loops such loops being connected to the upper ends of a pair of tines which tines are free to move independently of each other, and each tine has a separate chain which chains are supported in pairs by the extremities of the head, in combination with a pivoted trip lever, a roller at the outer end of the lever, an operating chain passing over the roller and ending at the swivel to which it is attached, a dog pivoted to the head separately from the trip lever, interacting parts of the dog and the lever for removing the dog from beneath the swivel on a movement of the chain, and a retractable spring for holding the trip lever against movement to thereby maintain the interlocking dog in engagement beneath the head of the swivel to hold the swivel on a projection of the head.

2. A hay fork head comprising a single casting, an attachable and detachable swivel supported by the casting, a trip lever pivoted on the casting, load carrying means separately and simultaneously supported by the casting and the swivel, control means attached to the swivel and the trip lever, a dog pivoted in the head separately from the trip lever, and interlocking means between the dog and the trip lever adapted to hold the swivel on a ledge of the casting while the trip lever is inactive and moving the dog away to release the swivel when the trip lever is actuated.

3. A hay fork head comprising a suitable casting or frame, means for supporting the frame, an attachable and detachable swivel supported by the frame, load carrying means supported separately by the frame and the swivel, a pivoted trip lever, and means for selectively holding the swivel comprising an independent means coacting directly with the swivel and the trip lever for locking the last said means in position.

4. In hay fork heads, a supporting frame, an attachable and detachable swivel held by the frame, load supporting means attached to the swivel, an enlarged head on the swivel, a pivoted trip lever, a separately pivoted dog interacting with the trip lever, and means for releasing the dog to drop the load and for replacing the same as desired.

5. In hay fork heads, a supporting frame, an attachable and detachable swivel cooperating with the frame, means comprising a dog pivoted on the frame for releasing and supporting the swivel, a trip lever separately pivoted on the frame, and interlocking means between the trip lever and the dog whereby the lever and dog are moved simultaneously.

6. In hay fork heads, a supporting frame, a swivel, an enlarged head to the swivel forming a shoulder under the head, means for holding the swivel on the frame comprising a dog pivoted on the frame, means for releasing the swivel from the frame by removing the dog from beneath the swivel shoulder comprising a separately pivoted spring actuated trip lever, and flexible means connected to the swivel and passing through an opening of the trip lever whereby as the flexible releasing means is actuated to move the trip lever against the tension of its spring the pivoted dog interlocked with the separately pivoted trip lever will be withdrawn from beneath the swivel head.

BRICE H. LANTZ.